United States Patent [19]
Curtil

[11] Patent Number: 4,561,253
[45] Date of Patent: Dec. 31, 1985

[54] METHOD OF OPERATING SUPERCHARGED DIESEL ENGINE WITH MODIFIED VALVE LIFT AND BYPASSED INTAKE AIR

[75] Inventor: Rémi Curtil, Montlignon, France

[73] Assignee: Societe d'Etudes de Machines Thermiques SEMT, Saint Denis, France

[21] Appl. No.: 706,900

[22] Filed: Feb. 28, 1985

Related U.S. Application Data

[63] Continuation of Ser. No. 416,076, Sep. 8, 1982, abandoned.

[30] Foreign Application Priority Data

Sep. 10, 1981 [FR] France .................................. 81 17177

[51] Int. Cl.⁴ .............................................. F02B 37/00
[52] U.S. Cl. .................................... 60/606; 123/90.6; 123/559; 123/568
[58] Field of Search ................... 60/606, 605; 123/559

[56] References Cited

U.S. PATENT DOCUMENTS

| | | | |
|---|---|---|---|
| 1,952,881 | 3/1934 | Minter | 123/568 |
| 2,292,233 | 8/1942 | Lysholm | 123/559 |
| 2,644,436 | 7/1953 | Berlyn | 123/559 |
| 3,298,332 | 1/1967 | Elsbett | 123/90.6 X |
| 3,412,552 | 11/1968 | Elsbett | 60/605 |
| 4,075,990 | 2/1978 | Ribeton | 60/602 X |
| 4,404,805 | 9/1983 | Curtil | 60/606 |

FOREIGN PATENT DOCUMENTS

| | | | |
|---|---|---|---|
| 569632 | 1/1959 | Canada | 60/605 |
| 1451910 | 7/1969 | Fed. Rep. of Germany | 60/606 |
| 1041230 | 5/1953 | France | 60/605 |

Primary Examiner—Michael Koczo
Attorney, Agent, or Firm—Kenyon & Kenyon

[57] ABSTRACT

A method of operating a four-stroke cycle Diesel engine supercharged by an exhaust gas-driven turbocompressor with valve timing comprising a partial overlap of the opening periods of the exhaust and intake valves, with early intake closure and partial exhaust closure for the major part of the intake step followed by partial reopening of the exhaust and its final closure near bottom dead center after closure of the intake valve. At low and medium engine powers part of the supercharged intake air is bypassed to an end of an exhaust manifold, thereby increasing the cylinder filling factor and combustion air excess and substantially reducing exhaust valve temperature in the mid-power operating range of the engine.

4 Claims, 5 Drawing Figures

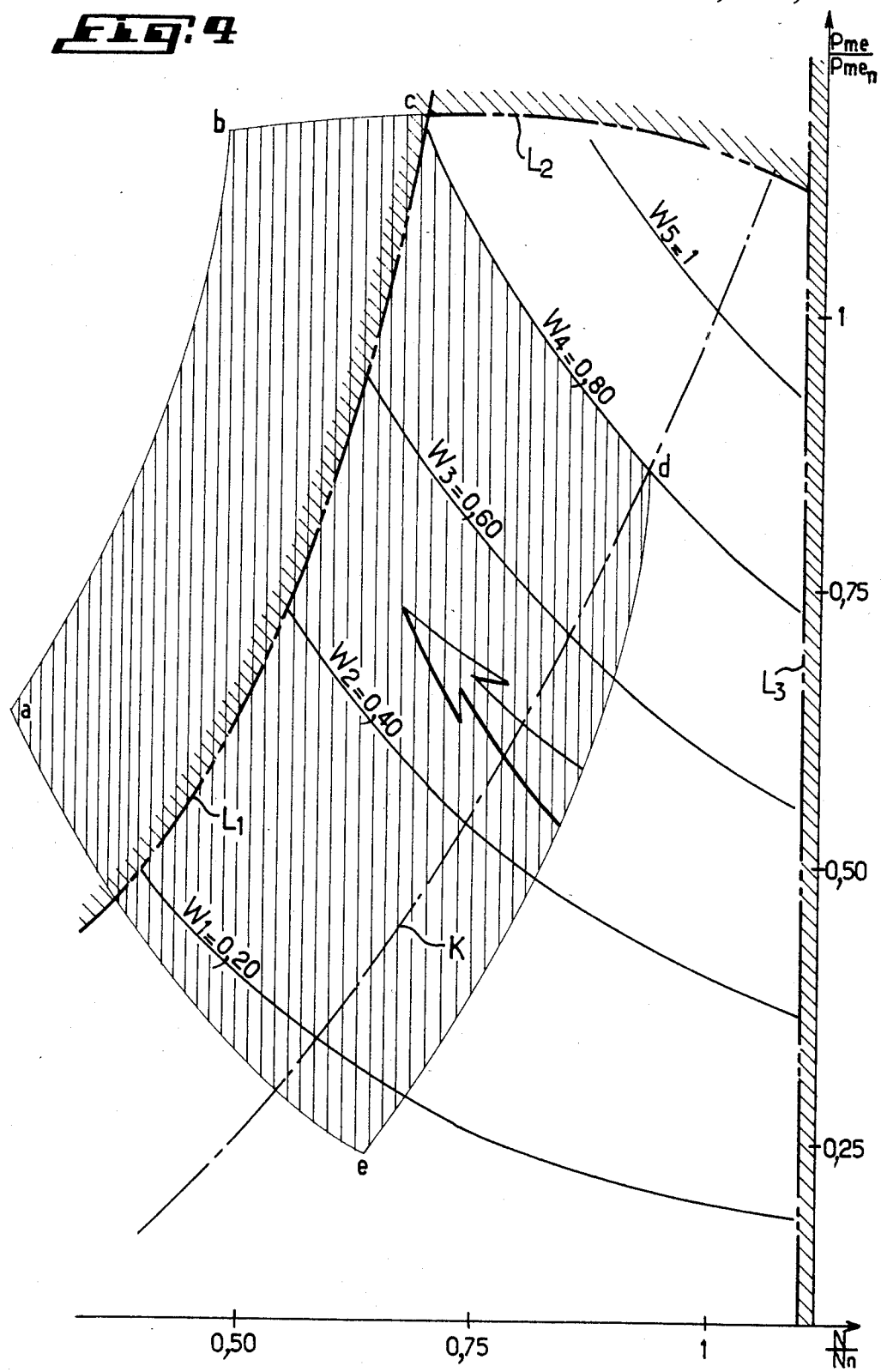

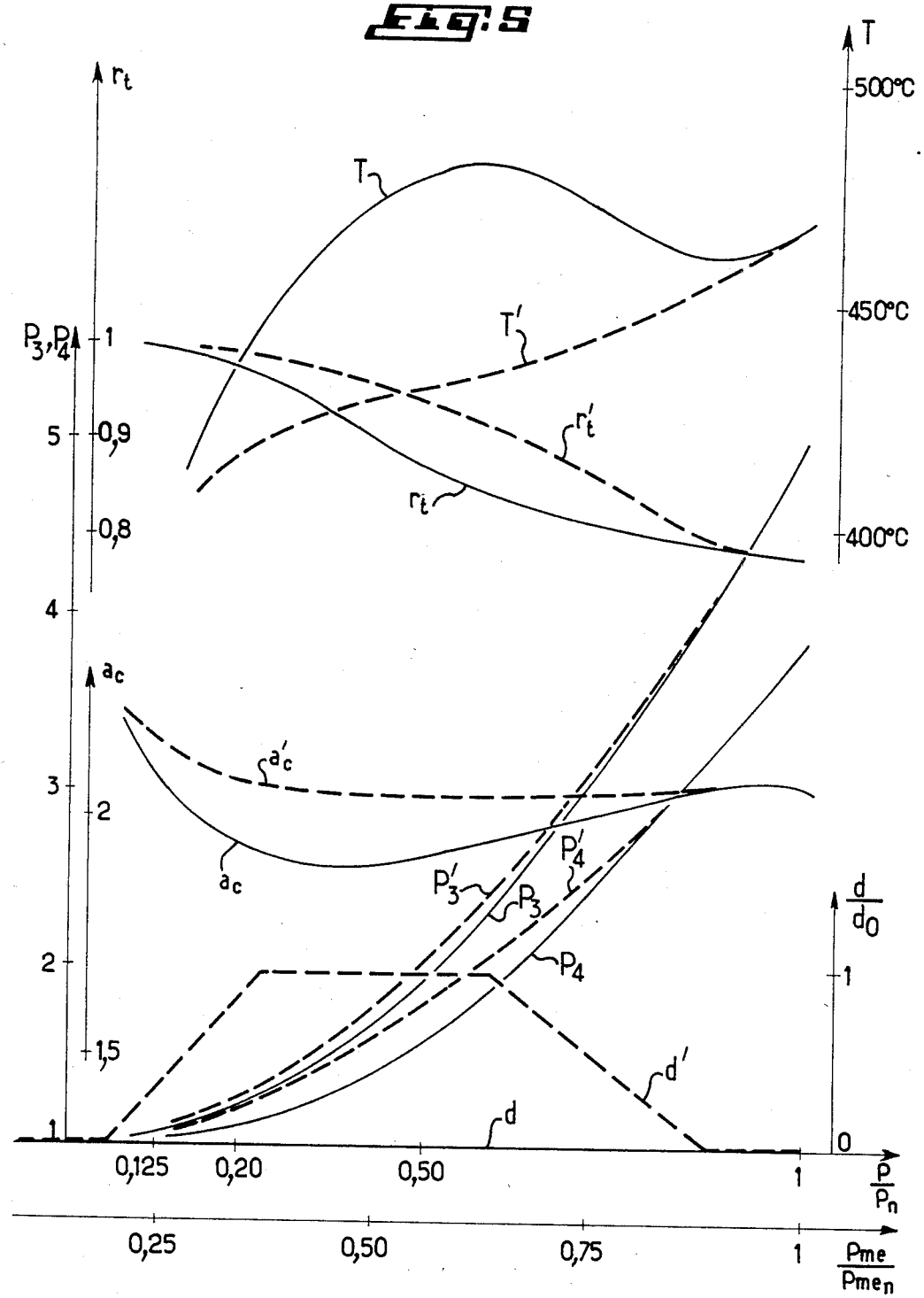

METHOD OF OPERATING SUPERCHARGED DIESEL ENGINE WITH MODIFIED VALVE LIFT AND BYPASSED INTAKE AIR

This application is a continuation, of application Ser. No. 416,076, filed Sept. 8, 1982, abandoned.

The present invention relates to a method of operating an internal combustion engine for improved running thereof and an internal combustion engine thus arranged for carrying out this method.

The invention is more particularly directed to a process of operating a supercharged four-stroke Diesel engine.

In U.S. Pat. No. 4,424,790 issued on Jan. 10, 1984 to the applicant, a method is disclosed for improving the efficiency of a four-stroke cycle Diesel engine supercharged under a constant pressure, of the type with early fixed closure of the inlet valve and partial overlap of the opening periods of the exhaust valve and of the inlet valve of each cylinder. By using a so-called improved Miller cycle the actual volumetric compression ratio and the temperature at the end of the engine compression stroke are automatically and gradually decreased during the time period extending from the moment after the first ignition (at start) to the moment of obtaining rated power. This known method performs an early closure of the intake valve as well as an at least partial closure of the exhaust valve during the major part of the air intake stage, with partial re-opening and then closure of the exhaust valve in the vicinity of bottom dead center after the closure of the air intake. The method thereby varies the filling factor of each cylinder in accordance with the instantaneous pressures at the air intake and gas exhaust, respectively, of each cylinder.

This known method suffers from the following drawback: the improvement of the filling factor at intermediate loads following the so-called screw propeller law has proved to be inadequate. With a load conforming to the screw propeller law, the mean effective pressure in each cylinder theoretically varies with the square of engine rotational speed, whereas the power output of the engine varies with the cube of rotational speed. Because this prior method depends too much upon the ratio between the air intake pressure and the exhaust gas pressure, which ratio is highest in this range, there is an insufficient excess combustion air and excessive exhaust valve temperature in the engine.

The following definitions are pertinent:

the filling factor is the ratio of the amount of air contained in the cylinder after the intake valve shuts to the amount of air theoretically contained in the cylinder at the density of the supercharging compressed air at the intake or suction inlet of the working cylinder;

the combustion air excess is the ratio of the amount of air present in the working cylinder to the amount of air stoichiometrically required for burning the amount of fuel fed into the working cylinder.

The main object of the invention is to eliminate the above described drawbacks of the prior art by providing a new method for varying the relation between the supercharged intake air pressure and the exhaust gas back-pressure, making it possible to selectively vary the filling factor of each cylinder by varying the back pressure of the exhaust gases. For that purpose the method according to the invention changes the natural relation between these pressures to selectively vary the cylinder filling factor.

According to another characterizing feature of the invention the cylinder pure air filling factor is varied during the starting period preceding the first ignition, preferably by increasing the ratio of the exhaust pressure to the intake pressure. For this purpose it is advantageous to provide, at least during the starting period, an adjustable pressure loss in the intake and/or the exhaust.

According to a further characterizing feature of the invention in the case of producing supercharged intake air by use of part of the energy of the exhaust gases, the cylinder filling factor is increased by raising the exhaust pressure more than the intake air pressure by selectively diverting, in accordance with the rotational speed and/or the instant load of the engine, supercharged intake air and by directing it to the exhaust gases before their usable power generating expansion. This arrangement results in a better operation of the engine at low and middle speeds.

Thus, a larger amount of air is trapped within each cylinder at the time of compression and combustion, thereby obtaining a greater combustion air excess and compressed air flow rate, as well as obtaining a higher supercharging pressure ratio. This results in the following advantages at low or medium speed of the engine:

improvement in the cold starting of the engine;

improvement of the combustion efficiency, thereby resulting in fuel savings and therefore in a spontaneous additional increase in the combustion air excess;

decrease in ignition delay and in the gradient of pressure increase thereby permitting the burning of fuels with a lower cetane number;

decrease in black smoke emissions;

extending the pumping limit of the centrifugal compressor for the supercharging air towards a lower running speed of the engine;

substantial diminishing of the noise of the engine, especially at idling speed and at low loads, owing to the effective control of the rate of the residual gases thereby resulting in a substantial reduction of the emission of nitrogen oxides at the exhaust (thereby decreasing the atmospheric pollution).

Such a valve control or timing as taught by U.S. Pat. No. 4,424,790 associated with the bypassed flow of compressed air, makes it possible at low or middle speed of the engine to increase the mean effective pressure and accordingly the engine torque obtainable through each working cylinder. The useful operating range is thus extended towards lower speeds.

In the prior art compressed air was bypassed by maintaining between the intake or suction input and the exhaust of the engine a predetermined pressure loss to enable the supercharging turbocompressor to operate as a gas turbine near the hunting curve and therefore with a high efficiency.

Bypassing compressed air within that operating range of the engine where it is useful would of course lead to a greater increase in the exhaust pressure than that in the air pressure, but without the exhaust pressure ever reaching the value of the intake air pressure. The fundamental concept of the present invention resides specifically in combining the same control or timing of the exhaust as defined previously with the natural effect of the by-passed flow of compressed air.

Owing to that combination it is possible to increase the amount of air entrapped within the working cylinder to a value which would be impossible to obtain with a conventional valve-control or timing and an associated by-passed flow of compressed air. The invention therefore profits by a physical phenomenon (decrease in the differential pressure between the intake air and the exhaust gases) usually considered as being unfavourable, because it is the exhaust pressure which eventually determines the cylinder filling factor as defined hereinabove.

According to still another characterizing feature of the invention, each exhaust valve of the engine is partially closed to a residual lift at most equal to approximately the operating play of backlash of said valve. This avoids any additional impact (hence with additional wear) of the exhaust valve against its seat, which would take place in case of a full closure of the valve before its partial reopening. Moreover this residual lift would improve the cooling of the exhaust valve (as taught by U.S. Pat. No. 4,296,715). A larger steady residual lift, without reopening, (such as shown by the curve A on FIG. 2 of U.S. Pat. No. 4,424,790) is not permitted by the present invention since near the bottom dead center of the piston the free effective cross section of flow passage-way is inadequate to fully obtain the desired effect. A still larger residual lift would result in excessive drawing in of exhaust gases under idling or transient conditions where the exhaust gas pressure is higher than the air pressure.

The invention is also directed to an internal combustion engine of the aforesaid kind arranged for carrying out the method according to the invention.

The invention will be better understood and further objects, characterizing features, details and advantages thereof will appear more clearly as the following explanatory description proceeds with reference to the accompanying diagrammatic drawings, given by way of non-limiting example illustrating a preferred specific embodiment of the invention and wherein.

FIG. 4 is a chart graphically showing the relative magnitude of the instantaneous effective mean pressure $P_{me}$ (expressed in terms of the rated effective mean pressure) versus the relative magnitude of the instant rotational speed N of the engine (expressed in terms of its rated speed). Various relative values of the instant power of the engine (expressed in terms of its rated power) are illustrated by a set of parametric curves, and a curve representative of the so-called screw propeller law of the variation of the mean effective pressure in accordance with the rotational speed of the engine is shown as a dot-dash line; and FIG. 5 graphically shows various characteristic curves of operating parameters of an engine operating according to the screw propeller law, this chart showing against the instant relative load or power and the instant relative mean effective pressure of the engine, the respective variations in the relative magnitude of the by-passed flow rate of compressed air (expressed in terms of the maximum flow rate), of the absolute intake air pressure $p_3$ and of the exhaust gas pressure $p_4$ (expressed in bars), of the air excess $a_c$, of the filling factor $r_f$ and of the exhaust valve temperature T (expressed in degrees celsius), respectively.

Figure 1:
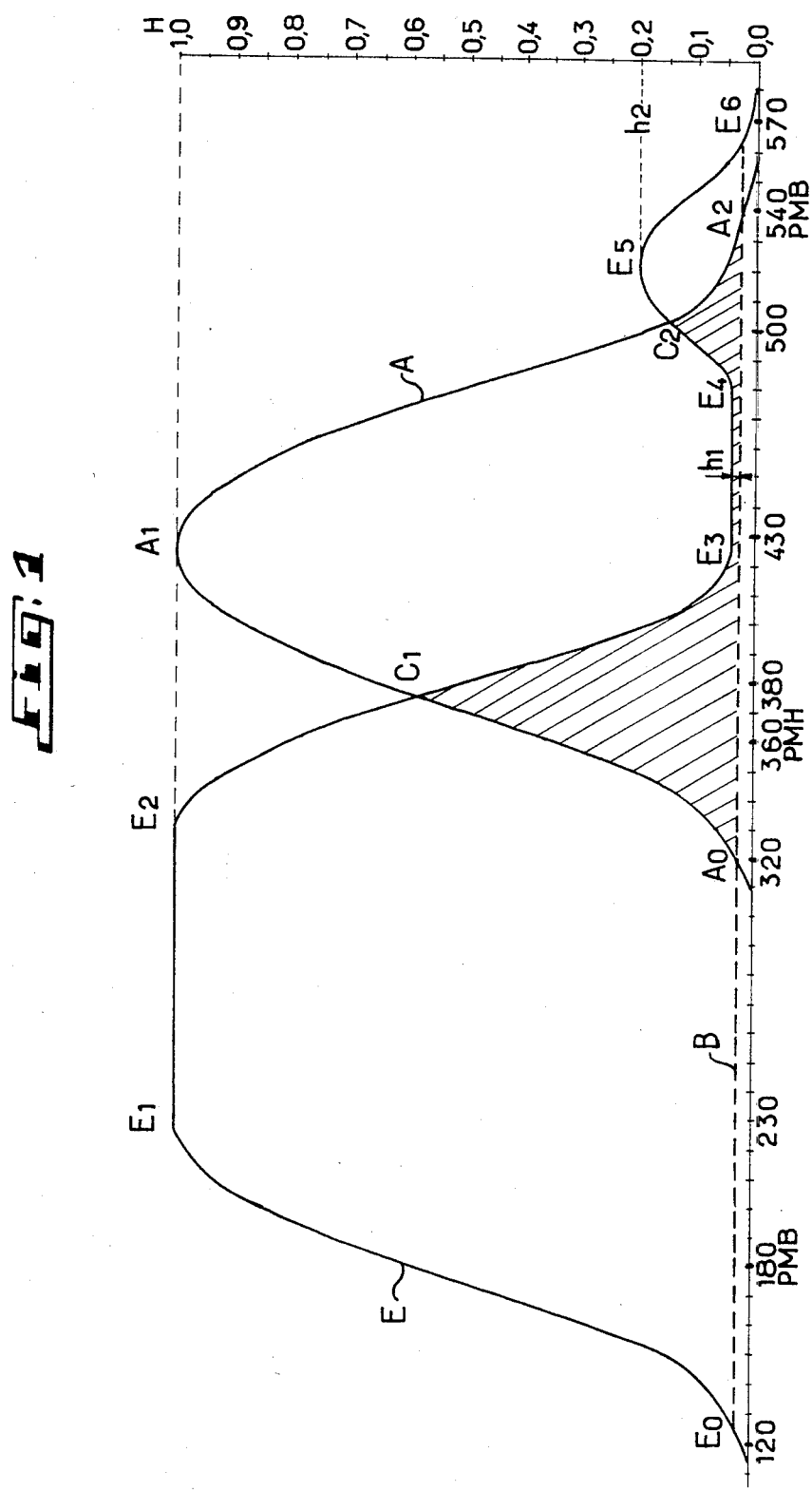
FIG. 1 is a chart for intake and exhaust valves according to the invention illustrating the variation in valve lift H (expressed in terms of the full or maximum lift) relative to the angular position of the crank shaft of the engine.

Referring to the exemplary embodiment illustrated in FIG. 1, which shows the exhaust valve lift curve E and the intake valve lift curve A during a four-stroke working cycle of the engine, the straight horizontal line B, drawn in dashes or as a broken line at a small height above the horizontal axis, shows the compensated value of the operating play or backlash of the valves. This reference line B symbolizes the actual position of ZERO lift, i.e. of full closure of the valves. When moving from left to right on this chart the motions of the valves would take place as follows:

The curve E of the exhaust valve starts with the opening of the exhaust valve at $E_o$ at an advance of about 55° with respect to the bottom dead center PMB of the piston. The valve opens gradually to the full opening at $E_1$, taking place at about 50° after bottom dead center PMB and retained up to $E_2$ over a crankshaft rotation of about 100°. Gradual closing starts at $E_2$, about 30° before top dead center PMH of the piston, and proceeds until reaching an almost shut residual opening position at $E_3$, about 60° after top dead center PMH and retained up to $E_4$ over about 60° of crankshaft rotation. This residual lift of the exhaust valve corresponds substantially to the operating play or backlash of the valve actuating mechanism. A partial reopening starts at $E_4$, about 60° before bottom dead center PMB and proceeds gradually over about 40° of crankshaft rotation up to a maximum value $E_5$, for instance of about 20%, located at about 20° from bottom dead center PMB. Finally, gradual closing starts from this maximum value at $E_5$ to terminate with full closure at $E_6$, about 25° after bottom dead center PMB.

The curve A of the lift of the intake valve starts with the opening at $A_o$, about 40° before top dead center PMH. The intake valve then gradually lifts until the full opening is reached at $A_1$, about 65° after top dead center PMH, and thereafter gradually shuts to full closure at $A_2$, which takes place at about 5° before bottom dead center PMB.

It thus appears that both the exhaust and intake valves open early. The intake valve also closes early; whereas the exhaust valve exhibits a closure lag. It should be pointed out that the above angular positions are here given by way of exemplary illustration and may vary depending on the type of the engine.

The curves of the exhaust and intake valves E and A, respectively, intersect each other at points $C_1$ and $C_2$, thereby creating a partial overlap of their respective opening time periods which is shown on FIG. 1 by the hatched area defined between the horizontal straight line B and the lines $A_oC_1E_3E_4C_2A_2$. The area $A_oC_1E_3$ corresponds to the period of scavenging the exhaust gases from the working cylinder, but it may be omitted or decreased for the benefit of the overlap $E_4C_2A_2$. A substantial partial overlap of the openings of the exhaust and intake valves about top dead center is not possible because of possible interference with the top of the piston. The point $C_1$, for instance, is about 15° after top dead center PMH and corresponds to a lift of about 58%; whereas the point $C_2$ is at about 38° before the bottom dead center PMB and corresponds to a lift of about 15%.

On the chart of FIG. 1 the value of the valve backlash shown by the ordinate of the horizontal straight line B corresponds to about 2.5% of the full lift H, so that the illustrated residual lift at $E_3$–$E_4$ of the exhaust valve is about 1.5% of the full lift H. This residual lift could be eliminated, if desired, as according to the aforesaid prior U.S. Pat. No. 4,424,790 in which FIG. 2 shows in curve $A_{2a}$ a full closure of the exhaust valve before partial reopening in the vicinity of the closing position $A_2$ of the intake valve.

This partial reopening, illustrated by the portion $E_4$-$E_5$-$E_6$ of the curve E, corresponds to an additional filling step obtained automatically by controlling the communication between the exhaust manifold and the working cylinder through the exhaust valve, which would then close shortly after bottom dead center PMB of the piston, but after the closing position of the intake valve.

Figure 2:
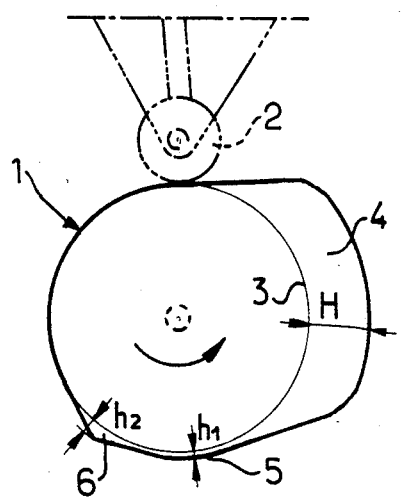
FIG. 2 is a perspective view of an exhaust valve actuating cam with an operative profile according to the invention.

FIG. 2 shows an embodiment of an exhaust valve actuating cam 1 for causing an exhaust valve lift according to the curve E of FIG. 1. This cam 1, cooperating with a follower roller 2 of a valve lifter, comprises the following radially outward projecting protrusion from a base circle 3:

the usual main boss 4 providing the full lift H of the exhaust valve along the portion $E_o$-$E_1$-$E_2$-$E_3$ of the curve E;

a minor boss 5 located behind the main boss 4 in the direction of rotation (counter-clockwise on FIG. 2) of the cam and merging into the main boss, this minor boss 5 providing a residual lift $h_1$ of the exhaust valve along the portion $E_3$-$E_4$ of the curve E and being concentric with the base circle 3 to produce a constant lift; and the additional boss 6 following the minor boss 5 in the direction of rotation of the cam and merging into the minor boss, this additional boss 6 having a sharp vertex providing for the partial re-opening corresponding to a lift $h_2$, equal to 20% of the full lift H (assuming no valve play or backlash) along the portion $E_4$-$E_5$-$E_6$ of the curve E of the exhaust valve, and merging into the base circle 3 of the cam at the full closure point of the exhaust valve.

Figure 3:
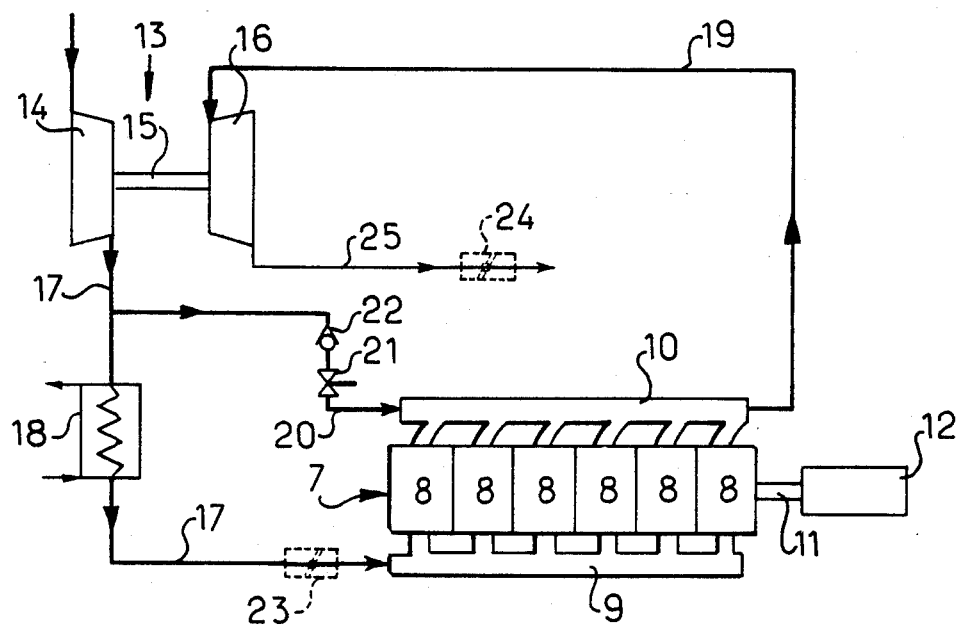
FIG. 3 is a block diagram of a Diesel engine arranged according to the invention.

FIG. 3 shows a practical embodiment of the invention as applied to a Diesel engine 7 with at least one row of cylinders 8 arranged in line (for example, six). The engine could include several rows of cylinders, for instance two rows of cylinders arranged in a Vee, in which case a supercharging blower set should be provided for each row of cylinders. The cylinders of this engine have an air intake manifold 9 and at least one exhaust manifold 10 for the burnt gases, which in the case of four to ten working cylinders per row should advantageously be a single manifold for each row and of the known so-called pulse converter modular type. A power output shaft 11 drives a power input apparatus 12 forming the engine load.

The engine 7 is supercharged by at least one turbocompressor 13 comprising a centrifugal air compressor 14 directly coupled through an intermediate shaft 15 to a drive turbine 16 driven by the exhaust gases of the engine. The outlet of the compressor is connected through a delivery duct 17 to the intake manifold 9 of the engine 7 through a heat exchanger 18 for cooling the engine supercharging compressed air. The inlet of the turbine 16 is connected through a duct 19 to the outlet of the exhaust manifold 10 of the engine.

According to an essential characterizing feature of the invention, a flow of compressed air is taken from the compressed air cooler by a compressed air bypass duct 20 connected to the delivery duct 17 ahead of the compressed air cooler 18 and discharging into at least one exhaust manifold of the engine. In the embodiment shown the bypass duct is connected to the upstream end of the exhaust manifold 10, so that the diverted flow of compressed air is fed into this manifold at the point of lowest instantaneous pressure of the exhaust gases therein. Delivering compressed air to the upstream end of the exhaust manifold is advantageous because the first working cylinder of the engine may then draw in additional air through the exhaust valve.

The by-passed flow of supercharging compressed air is advantageously adjustable and should be shut off when the engine is operating at a power level high enough for good efficiency of the turbocompressor. For this purpose the bypass duct 20 is provided with a throttling member for selectively varying the free cross section of the duct, such as a valve 21, which may be either of the "on or off" operating type or capable of gradual closing and opening (for increasing the flow rate of bypassed compressed air with decreasing rotational speed of the engine 7). The operation of this valve may be made automatic through a suitable servocontrol device.

To avoid any reversal of the direction of the compressed air within the bypass duct 20 it is necessary that the exhaust gas pressure within the exhaust manifold 10 be lower than the compressed air pressure within the by-pass duct 20. To automatically prevent such a flow reversal, a check valve 22 is advantageously mounted in the bypass duct 20, preferably ahead of the valve 21.

Moreover, and as known per se, it is advantageous to provide an adjusting member for selectively and gradually varying the cross section of free flow passage-way of the duct, such as a throttle valve or the like at 23 near the inlet of each intake manifold 9 of the engine and/or at 24 near the outlet of each exhaust manifold, respectively. The throttle valve 24 should be mounted in the outlet duct 25 for the exhaust gases from the turbine 16. Such throttles 23, 24 are optional.

FIG. 4 graphically illustrates the preferred useful range of the invention. On this Figure have been plotted the following curves and relative values:

on the abscissa: the ratio $N/N_n$ of the instantaneous rotational speed N of the engine to its rated rotational speed $N_n$;

on the ordinates: the ratio $p_{me}/p_{men}$ of the mean effective cycle pressure $p_{me}$ to the rated mean effective cycle pressure $p_{men}$;

the curve $L_1$ at the left, the curve $L_2$ at the top and the straight vertical line $L_3$ at the right, which successively intersect at the top and have sloping hatches on their outer side: these three curves show the normal operating limits of the engine within the inner area bounded by these curves;

five constant power curves $W_1$, $W_2$, $W_3$, $W_4$, $W_5$ corresponding to constant specific powers per cylinder of 20%, 40%, 60%, 80% and 100%, respectively, of the rated power;

the curve K in dash-dotted lines showing the variation in the mean effective pressure as a function of rotational speed of the engine according to the so-called screw propeller law (by which theoretically the mean effective pressure is proportional to the square of the rotation speed of the engine whereas the engine power output is proportional to the cube of rotational speed);

a vertically hatched area bounded by the lines a b c d e a and which defines the range wherein the stated improvements may be achieved with the present invention.

It may thus be seen that this range is located between approximately 10% and 80% of the rated power output of the engine, and the improvement produced by the invention increases from right to left in the direction of the arrow, i.e., substantially parallel to any constant power curve when the rotational speed of the engine is decreased.

FIG. 5 clearly shows the advantageous technical effects achieved with the invention in an engine operating in accordance with the screw propeller law. On this Figure are plotted the following curves and values:

on the abscissae: the relative power, which is the ratio $P/P_n$ of the instant power output P of the engine to its rated power output $P_n$, according to a non-linear scale and the relative mean effective pressure, which is the ratio $p_{me}/p_{men}$ of the instant mean effective cycle pressure $p_{me}$ to the rated mean effective cycle pressure $P_{men}$ according to a linear scale;

on the ordinates: at the left the absolute intake air pressure $p_3$ and the exhaust gas pressure $p_4$, respectively, measured in bars, as well as the combustion air excess $a_c$ at the bottom and the filling factor $r_t$ at the top; to the right, the degree of relative opening, which is the ratio of the instant degree of opening of the valve 21 in the by-pass air duct 20 to its maximum opening $d_o$, at the bottom and the temperature T of the exhaust valve, which more particularly is the temperature of the valve seating surface as measured in degrees centigrade, at the top.

On this chart the curves drawn in continuous solid lines and denoted with P, $P_3$, $P_4$, $a_c$, $r_t$, d, T, respectively, show the effect achieved without any bypassed flow of supercharging compressed air (i.e., without any by-pass or branch air duct 20), but with the valve timing system according to U.S. Pat. No. 4,424,790, i.e., with closure of the intake valve before bottom dead center of the piston and with partial reopening of the exhaust valve). By contrast, the curves drawn in discontinuous or broken lines and denoted with P', $P'_3$, $P'_4$, $a'_c$, $r'_t$, d', T', respectively, show the effect or improvement provided by combining said valve timing system with a diverted flow of supercharging compressed air through the use of a bypass air duct 20, the extent of opening of which is shown by the curve d'.

The following curves are shown from bottom to top:

curves d and d' showing the extent of relative opening (as expressed in terms of the maximum opening $d_o$;

the curves $P_4$, $P'_4$ showing the variation of pressure of the exhaust gases;

the curves $P_3$, $P'_3$ showing the variation of pressure of the intake air;

the curves $a_c$ and $a'_c$ showing the variation of the combustion air excess;

the curves $r_t$ and $r'_t$ showing the variation of the cylinder filling factor; and the curves T' and T showing the temperature of the exhaust valve.

Consideration of these curves leads to the following conclusions:

with the use of a by-passed flow of supercharging compressed air, i.e. when the valve 21 is at least partially open and the bypass air duct 20 is in operation, the pressure $p_4$ of the exhaust gases rises more than the pressure $p_3$ of the intake air, thus resulting in the following consequences;

increase in the cylinder filling factor from $r_t$ to $r'_t$ and therefore increase in the combustion air excess from $a_c$ to $a'_c$ with substantial lowering of the temperature of the exhaust valve from T to T', which temperature is representative of the thermal condition of the engine.

Thus a power decrease is attended by a reduction in temperature; whereas without the bypass flow according to the invention the temperature would increase with a decreasing load (which is particularly harmful in highly supercharged marine Diesel engines driving a fixed-pitch screw propeller).

What is claimed is:

1. A method of operating a four-stroke cycle supercharged diesel engine having at least one cylinder, each cylinder being provided with a piston reciprocating between top dead center and bottom dead center positions, an intake valve, an exhaust valve, and an exhaust manifold for the exhaust gases from the engine, the method including the steps of fully opening the exhaust valve at the beginning of an exhaust stroke; opening the intake valve prior to top dead center at the beginning of the intake stroke following said exhaust stroke; at least partially closing the exhaust valve during a major part of said intake stroke such that there is a partial overlap of the opening periods of the exhaust valve and intake valve; partially reopening the exhaust valve prior to bottom dead center at the end of the intake stroke; closing the intake valve at a fixed crank angle after the partial reopening of the exhaust valve and prior to bottom dead center at the end of the intake stroke; and closing the exhaust valve after closing the intake valve, wherein the improvement comprises:

bypassing part of a flow of compressed intake air around the engine at engine loads less than 80% of the full load operation of the engine; and directing said bypassed flow of compressed intake air into the exhaust manifold for the exhaust gases flowing from the engine at an upstream end of said exhaust manifold such as to decrease the difference between the intake air pressure and the exhaust pressure for improving the filling factor of the engine.

2. A method according to claim 1, wherein the step of at least partially closing the exhaust valve during a major part of the intake stroke comprises closing the exhaust valve to a maximum residual lift value equal to the backlash of the valve actuating mechanism.

3. A method according to claim 1, the method further comprising the step of expanding said exhaust gases flowing from the engine to generate useful energy for compressing said flow of intake air.

4. A method according to claim 1, wherein the step of closing the exhaust valve after closing the intake valve comprises closing the exhaust valve not later than 25 degrees after bottom dead center of the intake stroke.

* * * * *